United States Patent

[11] 3,628,180

[72] Inventor Joseph P. Segre
 45 Quaboag Road, Acton, Mass. 01720
[21] Appl. No. 823,919
[22] Filed May 12, 1969
[45] Patented Dec. 14, 1971

[54] TWO-SLAB LASER SYSTEM WITH COMPENSATION FOR LENS POWER
 9 Claims, 3 Drawing Figs.
[52] U.S. Cl. .................................................. 331/94.5
[51] Int. Cl. .................................................. H01s 3/00
[50] Field of Search ........................................ 331/94.5

[56] References Cited
UNITED STATES PATENTS
3,484,714 12/1969 Koester et al. ................. 331/94.5

Primary Examiner—Ronald L. Wibert
Assistant Examiner—T. Major
Attorney—Lane, Aitken, Dunner & Ziems ABSTRACT: A glass laser system comprises two slabs of laser glass in the laser cavity. The slab shape together with the thermal gradient induced by the flashlamps causes the slabs to act as cylindrical lenses. A prism is provided in the cavity between the slabs to laterally shift the laser rays to compensate for the cylindrical lens effect.

Patented Dec. 14, 1971
3,628,180
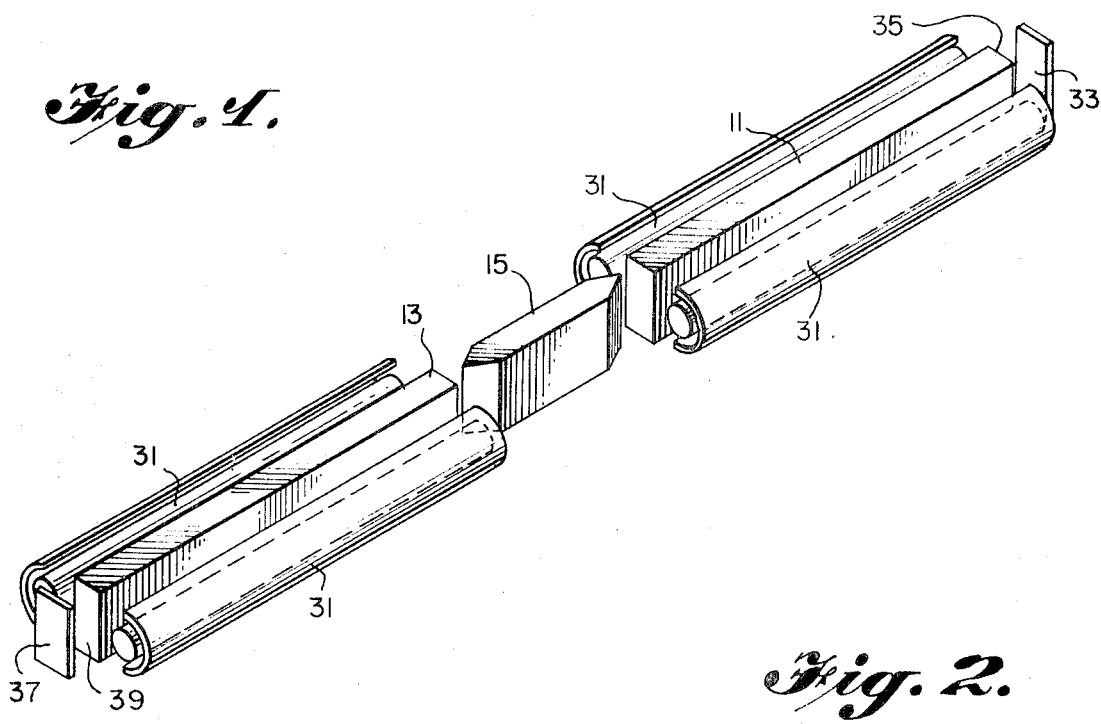
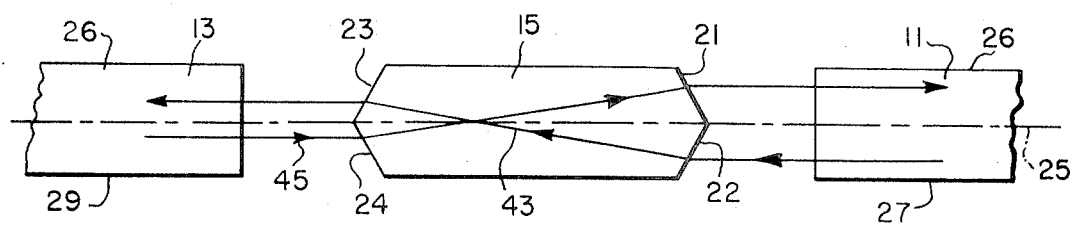
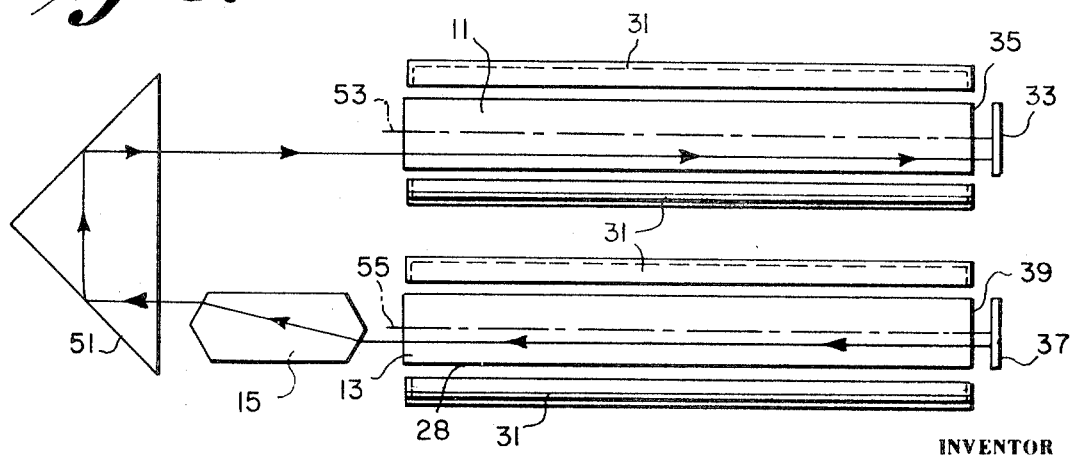
INVENTOR
JOSEPH P. SEGRE
BY Lane, Aitken, Dunner & Ziems
ATTORNEYS

TWO-SLAB LASER SYSTEM WITH COMPENSATION FOR LENS POWER

BACKGROUND OF THE INVENTION

This invention relates to glass laser systems and, more particularly, to a glass laser system with means to overcome the positive lens effect which arises from the thermal gradient in the laser rod.

A conventional glass laser is excited to a state in which it will amplify light by periodically or continuously illuminating the rod with high-intensity flashlamps. This excitation process is called pumping and the light which excites the laser material is called pump light. The light which the laser material amplifies is called laser light.

The pumping of a glass laser rod introduces heat into the rod approximately uniformly per unit volume throughout the rod. Yet heat is extracted from the rod only from the surface of the rod. As a result, in a round glass laser rod of the conventional configuration having an axial length much longer than its diameter, a radial thermal gradient is built up. The radial thermal gradient results in a radial gradient in the index of refraction within the laser rod with the index being higher at the center of the rod than it is at the surface of the rod. As a result, the rod acts as a positive lens upon the laser beam and operates to focus the laser beam in the center of the laser rod.

The focusing of the laser beam by the laser rod is undesirable because the volume in which the laser action takes place is reduced thus reducing the efficiency of the rod. Moreover, the spread of the laser beam produced by the rod is increased. In most laser applications, minimum beam spread is desired at the target receiving the laser beam in order to deliver maximum energy to the target. In addition, because of the positive lens action of the laser rod, the laser beam can collapse into a destructive filament as a result of self-focusing of the laser beam. Self-focusing of a laser beam causing the laser beam to collapse into a destructive filament occurs because the index of refraction in material, in general, is increased by the high-intensity electric field present in the laser beam. The intensity of a laser beam is usually highest in the center and varies with a gaussian distribution from the center outwardly. As a result, the index of refraction in general will be higher at the center of the medium through which the beam is passing than it will at the edge. If the increase in the index of refraction with the electric field in the laser beam is high enough, the beam will collapse due to the resulting dynamic positive lensing effect into a diffraction limited filament. At this point, the power density in the laser beam will exceed the damage threshold of the material and a fine fossil record is left where the laser beam passes through the material. The self-focusing resulting in the laser beam collapse will occur at a much lower threshold when even a small amount of positive lens power is initially present in the material. Thus, the presence of the thermal radial gradient will lower the threshold at which this beam collapse occurs.

In the glass lasers of the prior art, a number of approaches have been employed to overcome the problem of thermal lensing such as introducing into the cavity negative lenses to counteract the positive lens effect of the thermal gradient. This method of compensation has the disadvantage that it compensates for only one set of operating conditions. A zoom telescope could be used in the laser cavity to counteract the effects of thermal lensing but the telescope requires continuous resetting as the operating conditions change.

SUMMARY OF THE INVENTION

The present invention provides an entirely different approach to the problem of thermal lensing. In accordance with the present invention, the laser glass instead of being in the shape of a round rod is in the form of two rectangular slabs which are pumped by means of flashlamps located opposite the larger sidewalls of the slabs. As a result, the thermal gradient which is produced in the laser glass of each slab is approximately one dimensional in that it approaches the condition of having the locus of the maximum temperature in a plane parallel to the larger sidewalls of the slab passing through the middle of the slab. The temperature gradient decreases from the high-temperature plane toward the larger sidewalls of the slab. As a result, the slabs act like positive cylindrical lenses tending to focus the laser light toward the high-temperature planes in the middle of the slabs. In accordance with the present invention, a prism is provided optically between the two slabs to displace the rays near the central high-temperature plane in each slab to be near the larger sidewalls in the other slab and to displace the rays near the larger sidewalls in each slab to be near the center of the other slab. As a result, each ray passes through material of a relatively high index of refraction in one slab and through material of a relatively low index of refraction in the other slab and in this manner the lens power of the slabs cancels out.

Accordingly, an object of the present invention is to provide an improved glass laser system.

Another object of the present invention is to overcome the problem of thermal lensing in a glass laser system.

A further object of the present invention is to provide a laser system in which the problem of thermal lensing is overcome.

A still further object of the present invention is to overcome the one-dimensional thermal gradient that is produced in a slab-type laser system.

Further objects and advantages of the present invention will become readily apparent as the following detailed description of the invention unfolds and when taken in conjunction with the drawings.

BRIEF DESCRIPTION OF THE DRAWINGS

FIG. 1 illustrates a perspective view of one embodiment of the present invention;

FIG. 2 is a plan view of a portion of the embodiment of FIG. 1 illustrating the path of laser rays in the system; and, FIG. 3 is a plan view of another embodiment of the present invention.

DESCRIPTION OF THE PREFERRED EMBODIMENTS

The embodiment of the invention shown in FIGS. 1 and 2 comprises two slabs 11 and 13 of laser glass positioned in longitudinal alignment with one another. A transparent glass prism 15 is positioned between the slabs having end faces 21 and 22 on one end facing the slab 11 and end faces 23 and 24 on the other end facing the slab 13. The pair of end faces 21 and 22 come together in a V, the apex of which is on a plane 25 passing through the centers of both the slabs 11 and 13 parallel with the larger sidewalls 26 through 29 of the slabs. Similarly the end faces 23 and 24 come together forming a V, the vertex of which is on the center plane 25. The prism 15 has the same width and height as the slabs 11 and 13. The end faces 21 through 24 all form equal angles with center plane 25 and the diagonally opposite end faces are parallel. The laser glass comprising the slabs 11 and 13 for example can be glass doped with neodymium, which when excited will amplify and emit light having a wavelength of 1.06 microns. Two flashlamps 31 for pumping the laser material of the slabs 11 and 13 are positioned on each side of each of the slabs 11 and 13 opposite the sidewalls 26 through 29 to irradiate the slabs 11 and 13 through these sidewalls. A mirror 33 is provided to reflect laser light rays passing out of the slab 11 through the end face 35 thereof back into the slab 11. Similarly a mirror 37 is provided to reflect light passing out of the slab 13 through the end face 39 thereof back into the slab 13. An imaginery line extending longitudinally through the middle of the slabs 11 and 13 between the mirrors 33 and 37 is referred to as the optic axis of the laser system. The space between the mirrors 33 and 37, including that occupied by the slabs 11 and 13 and the prism 15 is referred to as the laser cavity. Laser rays passing through the slabs parallel with the optic axis are referred to as axial rays.

When the lamps 31 irradiate the slabs 11 and 13 to excite them, laser light will be emitted spontaneously within the slabs. This laser light upon passing through the slabs 11 and 13 will induce further emissions which will be in phase with the inducing light. Thus, as the laser light passes through the slabs 11 and 13 it will be amplified. The axial laser rays through slab 11 toward prism 15 will be transmitted by the prism 15 into the slab 13 laterally displaced from its position in slab 11 but still parallel with the optic axis. Similarly axial laser rays passing through the slab 13 toward the prism 15 will be transmitted by the prism 15 into the slab 11 laterally displaced but still parallel with the optic axis. As pointed out above, the mirrors 33 and 37 will reflect these axial rays back into the slabs 11 and 13 where the rays will experience further amplification. Thus, the axial rays will be repeatedly reflected back and forth between the mirrors 33 and 37 and will be amplified with each pass through each of the slabs 11 and 13. As a result, a standing wave of high-intensity laser light energy, referred to as laser scintillations, will be set up between the mirrors 33 and 37. The mirror 33 is made 100 percent reflective at the wavelength of the laser light and the mirror 37 is made partially transmissive to permit light energy from the laser oscillations as to pass through in the form of a laser beam to a utilization device.

The pump light from the flashlamps 31 introduces heat into the slabs 11 and 13 approximately uniformly per unit volume. However, heat is removed from the slabs 11 and 13 only from the surfaces and as a result a thermal gradient is set up in the slab from the middle thereof toward the surfaces. Because the largest surface areas of the slabs 13 are the large sidewalls 26 through 29 facing the flashlamps 31, most of the heat is lost from the slabs through these sidewalls. As a result the thermal gradient set up in the slabs 11 and 13 is approximately one dimensional with the locus of the highest temperature being on the center plane 25 and with the temperature gradient decreasing from the center plane 25 toward the large sidewalls 26 through 29. The index of refraction of the laser glass varies with the temperature being highest where the temperature of the glass is lowest. Thus, the optical length of the slabs 11 and 13 will be the greatest in the center of the slabs and will be the least near the sidewalls. Moreover, because of the one-dimensional thermal gradient produced in the slabs and the resulting gradient in the index of refraction, the slabs 11 and 13 will act as cylindrical lenses tending to focus the laser light in the center plane 25.

The prism 15 acts to compensate for this thermal lensing and eliminate its effect. How the prism 15 accomplishes this compensating effect best can be explained with reference to FIG. 2 in which the arrows 43 and 45 represent paths of typical axial laser rays passing through the slabs 11 and 13. Axial laser rays which enter the prism 15 through the face 22, such as the ray 43, will be refracted to the face 23 where they will be refracted back to parallel with the optic axis. In a similar manner axial laser rays entering the prism 15 through the face 23 will be refracted to the face 22 where they will be refracted back to parallel with the optic axis. Likewise, axial rays entering the prism 15 through the face 21 will be refracted to the face 24 and vice versa and upon leaving the prism through the opposite face will be refracted back to parallel with the optic axis. In this manner, the prism 15 laterally shifts the axial rays in passing from one of the slabs to the other and at the same time maintains the rays parallel with the optic axis.

The lateral shifting of the rays provided by the prism 15 causes the axial rays passing through the right side of the slab 11 to pass through the left side of slab 13 and vice versa. Similarly the axial rays passing through the left side of the slab 11 are shifted to pass through the right side of the slab 13 and vice versa. The faces 21 to 24 of the prism 15 are oriented at angles and are spaced from one another so that the distance that each axial ray passing through the slab 11 is from the center plane 25 is equal to the distance that this ray is from the nearest one of the sidewalls 28 and 29 while passing through the slab 13. Moreover, the distance that each axial ray passing through the slab 13 is from the center plane 25 is equal to the distance that such ray is from the nearest one of sidewalls 26 and 27 while passing through the slab 11. Thus, the distance that the ray 43 is from the center plane 25 in the slab 13 is equal to the distance of this ray in the slab 11 from the sidewall 27. Similarly the distance that the ray 45 in the slab 11 is from the center plane 25 is equal to the distance that the ray 45 in the slab 13 is from the sidewall 29.

As pointed out above, as a result of the one-dimensional thermal gradient in the slabs caused by the pumping by the flashlamps 31, a one-dimensional gradient in the index of refraction will exist in the slabs 11 and 13 with the highest index of refraction being at the center plane 25 and the lowest index of refraction being at the sidewalls 26 through 29. As a result the optical length of the slabs will be greatest near the center of the slabs and will be shortest near the sidewalls of the slabs and, accordingly, the slabs 11 and 13 will act as cylindrical lenses. However, because the prism 15 transfers the rays near the center of the slab 11 to near the sidewalls 28 and 29 of the slab 13 and transfers the rays near the center of the slab 13 to near the sidewalls 26 and 27 of the slab 11, the optical length of the paths for all the axial laser rays from one end of the cavity to the other will be very nearly the same. Accordingly, the cylindrical lensing effect of the slabs will be cancelled.

In the embodiment of FIG. 3, the slabs 11 and 13 instead of being arranged colinearly are arranged side by side. As in the embodiment of FIG. 1, flashlamps 31 are placed on opposite sides of each of the slabs 11 and 13 to pump the slabs through their larger sidewalls 26 through 29. Similarly, as in the embodiment of FIG. 1, the mirror 33 is placed opposite the end face 35 to reflect laser rays received from the slab 11 back into the slab 11. Likewise the mirror 37 is placed opposite the end face 39 of the slab 13 to reflect laser rays received from the slab 13 back into the slab 13. A roof prism 51 is placed facing the opposite ends of the slabs 11 and 13 positioned to reflect rays received from the slab 11, into the end face of slab 13 and vice versa. The prism 15 is provided between the roof prism 51 and the slab 13 so as to provide lateral shifting of the rays as is done in the embodiment of FIGS. 1 and 2. In this embodiment the mirrors 33 and 37 again define the laser cavity, which is bent into a U-shape by the roof prism 51. The optic axis of the system is also bent at right angles into a U-shape by the roof prism and extends longitudinally through the centers of the slabs 11 and 13. As in the embodiment of FIGS. 1 and 2 laser rays passing through the slabs 11 and 13 parallel with the optic axis are referred to as axial rays. The center plane of the slab 11 passing through the center of slab 11 parallel with the sidewalls 26 and 27 is designated by the reference number 53 and the center plane of the slab 13 passing through the center of the slab 13 parallel with sidewalls 28 and 29 is designated by the reference number 55.

As in the embodiment of FIGS. 1 and 2, the prism 15 reflects axial rays to the opposite diagonal face where they are again refracted to parallel directions. If the prism 15 were not present in the embodiment of FIG. 3, the laser rays passing through the slab 13 below the center plane 55 would be reflected by the roof prism 51 into the part of the slab 11 above the center plane 53. The shifting provided by the prism 15 causes the axial rays passing through the lower half of the slab 13 to also travel through the lower half of the slab 11. Similarly the axial rays passing through the upper half of the slab 13 will pass through the upper half of the slab 11. The axial laser rays will be repeatedly reflected back and forth through the slabs 11 and 13 by means of the mirrors 33 and 37 and by the prism 51. As a result of the amplification which occurs in the excited slabs 11 and 13, laser oscillations will be set up between the mirrors 33 and 37. The lateral shifting provided by the prism 15 shifts each ray so that the distance that the ray is from the center plane 53 in the slab 11 is equal to the distance that the ray in the slab 13 is from the nearest sidewall and vice versa. Thus, the distance an axial laser ray on path 57 is from the center plane 53 in the slab 11 will be equal to the distance that this ray is from the sidewall 28 in the slab 13. Accordingly, the prism 15 will compensate for the cylindrical thermal lensing occurring in the slabs 11 and 13 as a result of the pumping by the flashlamps 31 just as it is accomplished in the embodiments of FIGS. 1 and 2.

The system of the present invention thus overcomes the problem of thermal lensing first by causing the laser rods to act as a cylindrical lens as a result of the slab shape of the laser material and by cancelling out this cylindrical lensing effect by the action of the prism 15.

I claim:

1. A laser system comprising a means defining a laser cavity, first and second slabs of laser material arranged longitudinally in series in said cavity, means to excite said laser material positioned to produce an approximately one-dimensional thermal gradient in said slabs with the locus of highest temperature in each of said slabs falling on a center plane of such slab passing through such slab parallel to sidewalls of such slab, means in the optical path between said slabs to laterally shift laser rays passing through said slabs parallel to the longitudinal dimensions thereof causing the laser rays passing through each one of such slabs near said sidewalls thereof to pass through the other of said slabs near said center plane thereof.

2. A laser system as recited in claim 1 wherein said laser ray shifting means comprises means to shift said laser rays so that the distance that each ray in each one of said slabs is from said center plane thereof is equal to the distance that such ray is from the nearer one of said sidewalls in the other of said slabs.

3. A laser system as recited in claim 1 wherein said sidewalls of said slabs comprise the larger sidewalls of said slabs.

4. A laser system as recited in claim 3 wherein said pumping means comprises flashlamps positioned to irradiate each of said slabs through said sidewalls.

5. A laser system as recited in claim 1 wherein said means to laterally shift said laser rays comprises a prism positioned in said cavity between said slab, said prism having V-shaped end faces through which pass the laser rays passing through said slabs parallel to the longitudinal dimension thereof.

6. A laser system as recited in claim 5 wherein said sidewalls of each of said slabs comprises the larger sidewalls of said slabs.

7. A laser system as recited in claim 6 wherein said pumping means comprises flashlamps positioned to irradiate each of said slabs through said sidewalls.

8. A laser system as recited in claim 1 wherein said slabs are arranged colinearly in said cavity.

9. A laser system as recited in claim 1 wherein said slabs are arranged side by side and means are provided to reflect laser rays received from one end face of one of said slabs to the other end face of the other of said slabs and vice versa.

* * * * *